US012590862B2

(12) United States Patent
Kilwy et al.

(10) Patent No.: US 12,590,862 B2
(45) Date of Patent: Mar. 31, 2026

(54) DEVICES, SYSTEMS, AND METHODS FOR INDUCING AUTOMOTIVE BODY VIBRATION

(71) Applicant: TOYOTA MOTOR NORTH AMERICA, INC., Plano, TX (US)

(72) Inventors: Bradley W. Kilwy, McKinney, TX (US); Tyler J. Kass, Hickory Creek, TX (US)

(73) Assignees: TOYOTA MOTOR NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 290 days.

(21) Appl. No.: 18/349,040

(22) Filed: Jul. 7, 2023

(65) Prior Publication Data

US 2025/0012663 A1 Jan. 9, 2025

(51) Int. Cl.
G01M 17/007 (2006.01)
G01M 7/02 (2006.01)
G06F 3/04847 (2022.01)

(52) U.S. Cl.
CPC .......... G01M 7/022 (2013.01); G01M 17/007 (2013.01); G01M 17/0078 (2013.01); G06F 3/04847 (2013.01)

(58) Field of Classification Search
CPC ...... G01M 7/022; G01M 17/007; G01M 7/02; G01M 17/0078; G06F 3/04847
USPC ............... 73/12.01, 572, 645–648, 659, 660, 73/662–664, 669, 670; 701/29.1, 31.6, 701/31.7, 31.8, 32.8, 33.2, 33.5, 34.4
See application file for complete search history.

(56) References Cited

U.S. PATENT DOCUMENTS

| | | | |
|---|---|---|---|
| 5,551,298 A | * | 9/1996 | Rayment .......... G01M 17/0078 73/579 |
| 10,013,967 B2 | | 7/2018 | Zafeiropoulos |
| 10,906,398 B2 | | 2/2021 | Ricci |
| 10,967,518 B2 | | 4/2021 | Neuhaus |

FOREIGN PATENT DOCUMENTS

| | | | | |
|---|---|---|---|---|
| AU | 2012203786 A1 | | 1/2013 | |
| CA | 2208499 A1 | * | 12/1998 | ............ G01M 7/022 |
| CN | 108709751 A | * | 10/2018 | ............ G09B 25/02 |
| CN | 116296178 A | * | 6/2023 | ............ G01M 7/02 |

(Continued)

*Primary Examiner* — Robert R Raevis

(74) *Attorney, Agent, or Firm* — HAYNES AND BOONE, LLP

(57) ABSTRACT

A system generates realistic vibrations in a vehicle body. The system includes the vehicle, a power supply, a processor circuit including a processor and memory, and a user interface configured to select a frequency and amplitude for a sound or vibration. The system also includes at least one amplifier in communication with the user interface and configured to: receive power from the power supply and output an electrical signal at the selected frequency and amplitude. The system also includes at least one transducer configured to: attach to the vehicle, receive the alternating current electrical signal at the selected frequency and amplitude, and generate a vibration at the selected frequency and amplitude. When the transducer is attached to the vehicle, the vibration generated by the transducer is transmitted into components of the vehicle.

20 Claims, 13 Drawing Sheets

(56)        References Cited

FOREIGN PATENT DOCUMENTS

| | | | | | |
|---|---|---|---|---|---|
| EP | 1041376 | A2 | 10/2000 | | |
| JP | 3580931 | B2 * | 10/2004 | .......... | G01M 3/3272 |
| WO | 2022139671 | A1 | 6/2022 | | |

* cited by examiner

1100

1110 — IDENTIFY SUSPECT COMPONENT(S)

1120 — SELECT TRANSDUCER LOCATION(S)

1130 — PLACE TRANSDUCER(S)

1140 — APPLY POWER

1150 — SELECT FREQUENCIES

1160 — SELECT AMPLITUDE(S)

1170 — RECORD/ANALYZE SOUND IN VEHICLE CABIN

1180 — IDENTIFY SOURCE COMPONENT(S)

1190 — APPLY COUNTERMEASURE

1350

DEVICES, SYSTEMS, AND METHODS FOR INDUCING AUTOMOTIVE BODY VIBRATION

TECHNICAL FIELD

The subject matter described herein relates generally to identifying problematic sound sources in a vehicle and, more particularly, to apparatus, systems, and methods for inducing realistic vibration modes in a vehicle frame and body. This technology has particular but not exclusive utility for consumer and commercial cars and trucks.

BACKGROUND

During operation and movement, particularly at high speed, it is common for a vehicle interior to include numerous sounds and vibrations, some less desirable than others. In some cases, when technicians are diagnosing unwanted sound or vibration, a vehicle may be driven over a special road surface known variously as a rumble road, Belgian block road, cobble road, and otherwise. However, in practice, the sources of undesirable sounds may be difficult to identify when the vehicle is in motion, as technicians do not have safe or direct access to areas such as the vehicle undercarriage, engine compartment, behind the dashboard, etc., which may be critical portions of the noise transmittance path. Furthermore, placement of sensors in these areas may create mechanical, safety, or other problems, and may provide only indirect information about the sources and transmittance paths of undesirable sound.

In some cases, a chassis shaker machine may be used to vibrate the entire vehicle at various frequencies or combinations of frequencies. However, such shaker tables have numerous drawbacks, including high cost (e.g., several million dollars), fixed location, limited range of vibration frequencies, long investigation times, inability to isolate body-only components (e.g., to excite noise sources without the use of vehicle suspension, thus minimizing additional noise generated by suspension components), and an inability to focus force or vibration directly onto suspect parts, which can limit investigation flexibility and results. Furthermore, wind-induced vibrations cannot be realistically simulated by a shaker table, unless a powerful wind source is used as well, which may further increase the size, cost, and complexity of the investigation apparatus. Thus, a need exists for improved devices, systems, and methods for isolating the sources of undesirable vehicle sounds.

The information included in this Background section of the specification is included for technical reference purposes only and is not to be regarded as subject matter by which the scope of the disclosure is to be bound.

SUMMARY

Disclosed are devices, systems, and methods for inducing realistic vibration modes in a vehicle frame and body, without the need for a shaker table and without the vehicle having to be moving or for the engine to be running. The vibration induction and identification system disclosed herein includes one or more linear transducers, along with a processor to control the wattage, frequency ranges, and/or amplitude vs. frequency profiles of the transducers (e.g., via a user interface). In some embodiments, the system also includes microphones inside or outside the vehicle (e.g., positioned near the expected head locations for the driver or passengers), and the processor may be configured to record, analyze, and categorize any vehicle sounds generated by the vibration.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle, a power supply, a processor circuit may with a processor and a memory, and a user interface operating on the processor circuit and configured to select a frequency and amplitude. The system also includes at least one amplifier in communication with the user interface and configured to: receive power from the power supply, and output an electrical signal at the selected frequency and amplitude. The system also includes at least one transducer configured to: attach to the vehicle; receive the alternating current electrical signal at the selected frequency and amplitude; and generate a vibration at the selected frequency and amplitude. The system also includes where when the transducer is attached to the vehicle, the vibration generated by the transducer is transmitted into components of the vehicle. Other embodiments of this aspect include corresponding computer systems, apparatus, and computer programs recorded on one or more computer storage devices, each configured to perform the actions of the methods.

Implementations may include one or more of the following features. In some embodiments, the user interface is configured to select multiple frequencies or amplitudes, and the at least one amplifier is configured to output an electrical signal at the selected multiple frequencies or amplitudes, and the at least one transducer is configured to generate a vibration at the selected multiple frequencies or amplitudes. In some embodiments, the multiple frequencies or amplitudes may include a sweep. In some embodiments, the multiple frequencies or amplitudes may include a broadband noise profile which may include white noise, pink noise, blue noise, Brownian noise, blue noise, violet noise, gray noise, or velvet noise. In some embodiments, the at least one transducer may include a plurality of transducers receiving the electrical signal from one amplifier. In some embodiments, the at least one amplifier may include a plurality of amplifiers, each outputting an electrical signal at the selected frequency and amplitude. In some embodiments, the at least one amplifier may include a plurality of amplifiers, each outputting an electrical signal at different selected frequencies or amplitudes. In some embodiments, the vibration transmitted into components of the vehicle simulates a vibration generated by the vehicle moving over a surface. In some embodiments, the vibration transmitted into components of the vehicle simulates a user complaint of an unwanted sound or vibration. In some embodiments, the vibration transmitted into components of the vehicle can be used to identify a component responsible for the unwanted sound or vibration. In some embodiments, the selected frequency is in the range of between about 20 Hz and about 103 Hz. In some embodiments, the selected frequency is in the range of between about 1 Hz and about 21 kHz. Implementations of the described techniques may include hardware, a method or process, or computer software on a computer-accessible medium.

One general aspect includes a power supply a processor circuit with a processor and a memory, and a user interface operating on the processor circuit and configured to select a frequency and amplitude. The device also includes at least one amplifier in communication with the user interface and configured to receive power from the power supply, and output an electrical signal at the selected frequency and amplitude. The device also includes at least one transducer configured to: attach to a vehicle; receive the electrical signal at the selected frequency and amplitude; and generate a vibration at the selected frequency and amplitude. When the transducer is attached to the vehicle, the vibration generated by the transducer is transmitted into components of the vehicle. Other embodiments of this aspect include corresponding computer systems, apparatus, and computer programs recorded on one or more computer storage devices, each configured to perform the actions of the methods.

Implementations may include one or more of the following features. In some embodiments, the user interface is configured to select multiple frequencies or amplitudes, and the at least one amplifier is configured to output an alternating current electrical signal at the selected multiple frequencies or amplitudes, and the at least one transducer is configured to generate a vibration at the selected multiple frequencies or amplitudes. In some embodiments, the multiple frequencies or amplitudes may include a sweep or a broadband noise profile, which may include white noise, pink noise, blue noise, Brownian noise, blue noise, violet noise, gray noise, or velvet noise. In some embodiments, the at least one transducer may include a plurality of transducers or the at least one amplifier may include a plurality of amplifiers. In some embodiments, the vibration transmitted into components of the vehicle simulates a vibration generated by the vehicle moving over a surface. In some embodiments, the vibration transmitted into components of the vehicle simulates a user complaint of an unwanted sound or vibration and can be used to identify a component responsible for the unwanted sound or vibration. In some embodiments, the selected frequency is in the range of between about 20 Hz and about 103 Hz or between about 1 Hz and about 21 kHz. Implementations of the described techniques may include hardware, a method or process, or computer software on a computer-accessible medium.

One general aspect includes, with a processor circuit including a processor and a memory, selecting a frequency and amplitude using a user interface; with at least one amplifier in communication with the user interface: receiving power from a power supply, and outputting an electrical signal at the selected frequency and amplitude. The method also includes attaching at least one transducer to a corresponding at least one location on a vehicle. The method also includes with the at least one transducer: receiving the electrical signal at the selected frequency and amplitude; and generating a vibration at the selected frequency and amplitude. The vibration generated by the transducer is transmitted into components of the vehicle and simulates a vibration generated by the vehicle moving over a surface. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of vibration induction and identification system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
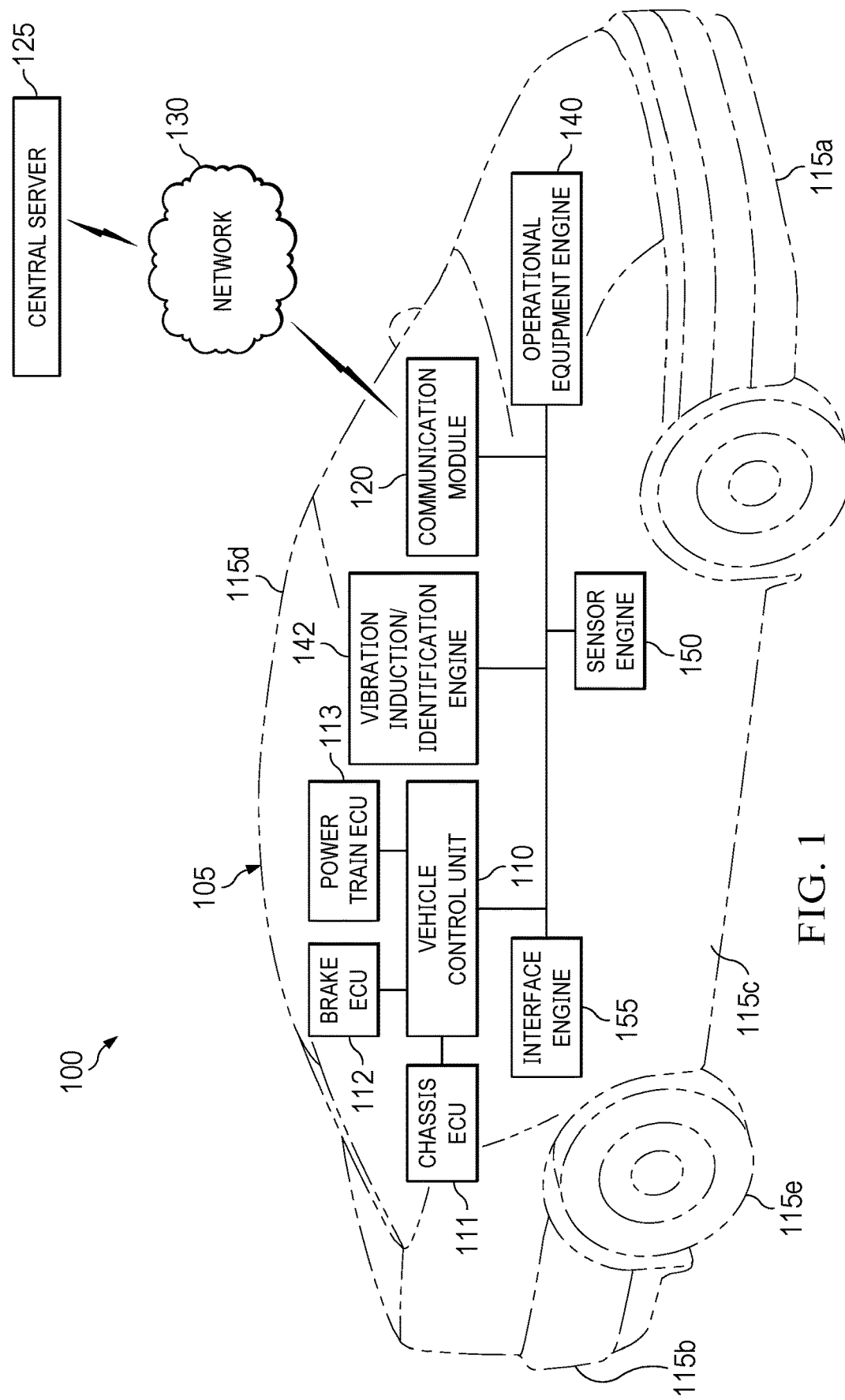
FIG. 1 is a diagrammatic illustration of a vehicle including a vibration induction and identification system, in accordance with at least one embodiment of the present disclosure.

Disclosed are devices, systems, and methods for inducing realistic vibration modes in a vehicle frame and body, that are representative of the vibration of a moving vehicle, or that induce particularly strong vibration in suspect components. This is accomplished without the need for a shaker table or wind tunnel, without the need for the vehicle to be in motion, for the vehicle to be powered on, or for the engine or powertrain components to be active. In fact, the vehicle may be parked (e.g. in a garage or parking lot) during the investigation.

In order to meet these requirements, the vibration induction and identification system disclosed herein includes one or more transducers that generate vibrations. These transducers may for example be compact, powerful audio speakers, although in a preferred embodiment the transducers are solenoids or other electrical, magnetic, or electromagnetic actuators with a mass attached, such that energizing the transducer causes a reversible displacement in the position of the mass. Such devices may also be variously known as linear transducers, tactile transducers, exciter transducers, or exciters. In some instances, they may also be known as bass shakers or low frequency effect transducers, although these terms may be misleading as some linear transducers are capable of vibrating at frequencies that, within the scope of human hearing, are not considered "low" (e.g., frequencies above 1 KHz, above 20 KHz, etc.). Unlike a speaker, such a linear transducer can induce displacement or vibration of the vehicle frame and body, without directly generating a significant amount of sound from the transducer itself. Rather, sounds are generated by the induced vibrations of vehicle components, and are not overwhelmed by sounds generated within the transducer. In an example, the transducers are each capable of generating sound or vibration in a frequency range of 1 Hz-21 KHz, with an accuracy of ±0.5 Hz. The vibrations of a vehicle suspension traveling over a road or off-road surface may tend to be in the 1-300 Hz range. However, to reproduce the widest range of problematic sounds and vibrations, it may be desirable for the transducers to be capable of producing vibrations across a much wider range of frequencies (e.g., 1 Hz-21 KHz). With a six-transducer system, this exemplary system may generate 600 Watts of power output and/or 4,200 pounds of force applied at the peak of each vibration. The transducers may be attached to key locations on the vehicle frame or body using special attachment hardware as described below.

It is noted that vibration of the vehicle frame and/or body at about 5 Hz-300 Hz can induce or excite vibration of other vehicle components at lower frequencies and/or significantly higher frequencies (e.g., resonance frequencies of the individual components, of assemblies of components, or harmonics thereof), resulting in a wide range of noises, including knocks, groans, rings, pings, ticks, clicks, and otherwise, as different components of the vehicle vibrate against one another. In general, the noises of concern fall into the range of human hearing, between 20 Hz and 20 KHz, although some scenarios may exist where induced vibrations above or below this range produce undesirable sensations or other undesirable effects, and thus merit investigation. Examples include unwanted seat vibration, unwanted steering wheel vibration, back hatch resonance, and/or mirror vibration that prevents a clear view of reflected objects. The present disclosure is directed toward identifying and mitigating all such unwanted vibrations, whether audible or not.

Under the control of a user interface, a processor (e.g., in a smart device or mobile device such as a smartphone, tablet computer, or laptop) controls the wattage, frequency ranges, and/or amplitude vs. frequency profiles of the transducers. This may be accomplished for example by generating sound profiles within the processor and communicating them (e.g., with a Bluetooth receiver or other wired or wireless receiver) to one or more amplifiers electrically connected to the transducers. When a certain tone (e.g., frequency and amplitude) or set of tones is generated by the processor, the amplifier generates electrical waves that are communicated to the transducers and output as linear displacement of a mass, which results in vibration of any surface to which the transducer is attached. The output of the transducers may be at a single frequency or multiple frequencies, or may include a sweep across a range of frequencies, or may be a playback of recorded vibration data (e.g., accelerometer data recorded on a vehicle traveling over a rumble road).

In some embodiments, the system also includes microphones inside or outside the vehicle (e.g., positioned near the expected head locations for the driver or passengers), and the processor may be configured to record, analyze, and categorize any vehicle sounds generated by the vibration. In other embodiments, the vehicle sounds induced by the vibration of the transducers may be listened to by a human technician, and assigned a location (e.g., from the right, from the front, etc.) and classification (e.g., ringing, groaning, knocking, pinging, etc.) at the time of the test.

Application of transducers to the vehicle body and/or structure allows for recreation, localization, and identification of noise sources and noise transmittance paths in automotive applications. The vibration induction and identification system allows discrete control of input frequency, energy, and location to the vehicle body, panels, frame, etc. to more accurately identify noise sources that may cause customer complaints or dissatisfaction, while also reducing safety risks to the investigator.

Thus, the vibration induction and identification system equipment can, in may ways, serve the same function as a million-dollar chassis shake machine, except that it may not induce movement of the wheels and suspension that are representative of road travel. The vibration induction and identification system is also able to vibrate across a much wider frequency range, can isolate body-only components of the vehicle, and can focus force directly onto suspect parts-procedures that may not be possible with a shake machine. Thus, the use of a shake machine limits investigation flexibility and results, increases investigation time, and dramatically increases costs and safety concern as compared with the vibration induction and identification system (which may for example cost only a few thousand dollars).

The vibration induction and identification system provides direct control of input amplitude, frequency, and location/source, to simulate or re-create unique customer use environments or scenarios. Investigation can be performed on a vehicle-by-vehicle basis, or on test articles representing entire makes, models, or brands. The vibration induction and identification system also provides improved safety by reducing the need for on-road evaluation to recreate vibration scenarios, and provides increased accuracy over on-road and shaker table evaluation, due to the ability to remove extraneous variables such as tire/suspension/bushing vibrations from the evaluation, and the ability to directly input energy into the location or locations of interest for a particular investigation.

The vibration induction and identification system can be applied to unibody, body-on-frame, and alternative structure vehicles, and can standardize evaluations across vehicle assembly lines/locations (e.g., the system can define a single evaluation standard that applies to both cars and pickup trucks due to removal of suspension, frame, wheel/tire difference from the evaluation). The vibration induction and identification system can thus facilitate re-creation of field issues at remote locations such as technical centers and dealerships. The vibration induction and identification system also enables better control over (e.g., elimination or reduction of) environmental variables such as temperature, humidity, wind, etc., as the evaluation can now be performed without driving a vehicle. The vibration induction and identification system thus enables substantial time savings for each field complaint phenomenon investigated, and provides the ability to quantify each complaint phenomenon and quantify the phenomena's potential audible outputs. In addition, the vibration induction and identification system provides an ability to recreate a typical phenomenon at a controlled audible level for auditors and investigators' sensory detection training and level setting, thus allowing future noise mitigation scenarios to be dealt with even more expediently.

When transducers are installed onto the subframe with the unique fabricated attachments (e.g., easy installation to body via subframe/body bolts) the operator uses an audio testing application to control the frequency and amplitude of the transducers from a Bluetooth transmitting device (e.g., a smartphone, tablet computer, or laptop) during the investigation. By, for example, performing a frequency sweep at different amplitudes, the investigator can hear, identify and hold the complaint noise phenomena (squeaks, rattles, unusual interior noises (UINs), etc.), while studying, repairing, or testing potential countermeasures for field application. Example countermeasures for mitigation of a user complaint may for example include tightening a loose bold, applying felt tape, applying a loss motion dampener, etc.

Performance of a 6-transducer system is sufficient to reproduce, while the vehicle is parked and stationary, realistic vibration scenarios for the vehicle moving across different surfaces in different weather conditions. The exemplary 6-transducer system may for example introduce peak forces of up to 4,200 lbs. on the frame and/or body of the vehicle (e.g., 7 lbs. per Watt×100 Watts per transducer×6 transducers), at frequencies from 1 Hz to 21 kHz+/−0.5 Hz, replicating most customer driving conditions in passenger vehicles. The vibration induction and identification system can also be employed in non-automotive applications to support similar investigations and study. Example applications may for example include aircraft, watercraft, construction machinery, farming equipment, factory equipment, etc.

It is noted that vibrations generated by the vibration induction and identification system may be capable of triggering collision countermeasures such as airbags. Thus, it may be advisable for the vibration induction and identification system to be employed when the vehicle is turned off, or when the vehicle is running but the airbags and other countermeasures are disabled.

The present disclosure aids substantially in identifying the sources of unwanted vehicle noise, by providing a rapid, low-cost means for inducing realistic vibrations in the frame and body of a parked vehicle. Implemented on a processor in communication with amplifiers, transducers, and (optionally) microphones, the vibration induction and identification system disclosed herein provides a practical means to reproduce user-reported vehicle noises by inducing realistic vibrations. This simplified vibration testing transforms a vehicle that generates unwanted noises into one where the noise sources are identified for the application of countermeasures, without the normally routine need for road testing, or testing with a wind tunnel and/or shaker table. This unconventional approach improves the functioning of the vehicle, by reducing driver distractions and thus improving the driving experience.

The vibration induction and identification system may be implemented as a process at least partially viewable on a display, and operated by a control process executing on a processor that accepts user inputs from a keyboard, mouse, touchscreen, or similar interface, and that is in communication with one or more sensors, amplifiers, and/or transducers. In that regard, the control process performs certain specific operations in response to different inputs or selections made at different times, and/or in response to real-time or near-real-time sensor readings. Certain structures, functions, and operations of the processor, display, sensors, and user input systems are known in the art, while others are recited herein to enable novel features or aspects of the present disclosure with particularity.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the vibration induction and identification system. Certain features may be added, removed, or modified without departing from the spirit of the claimed subject matter.

FIG. 1 is a diagrammatic illustration of a vibration induction and identification system in accordance with at least one embodiment of the present disclosure. In an example, a vibration induction and identification system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vibration induction and identification system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, sensor engine 150, and a vibration induction and identification engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
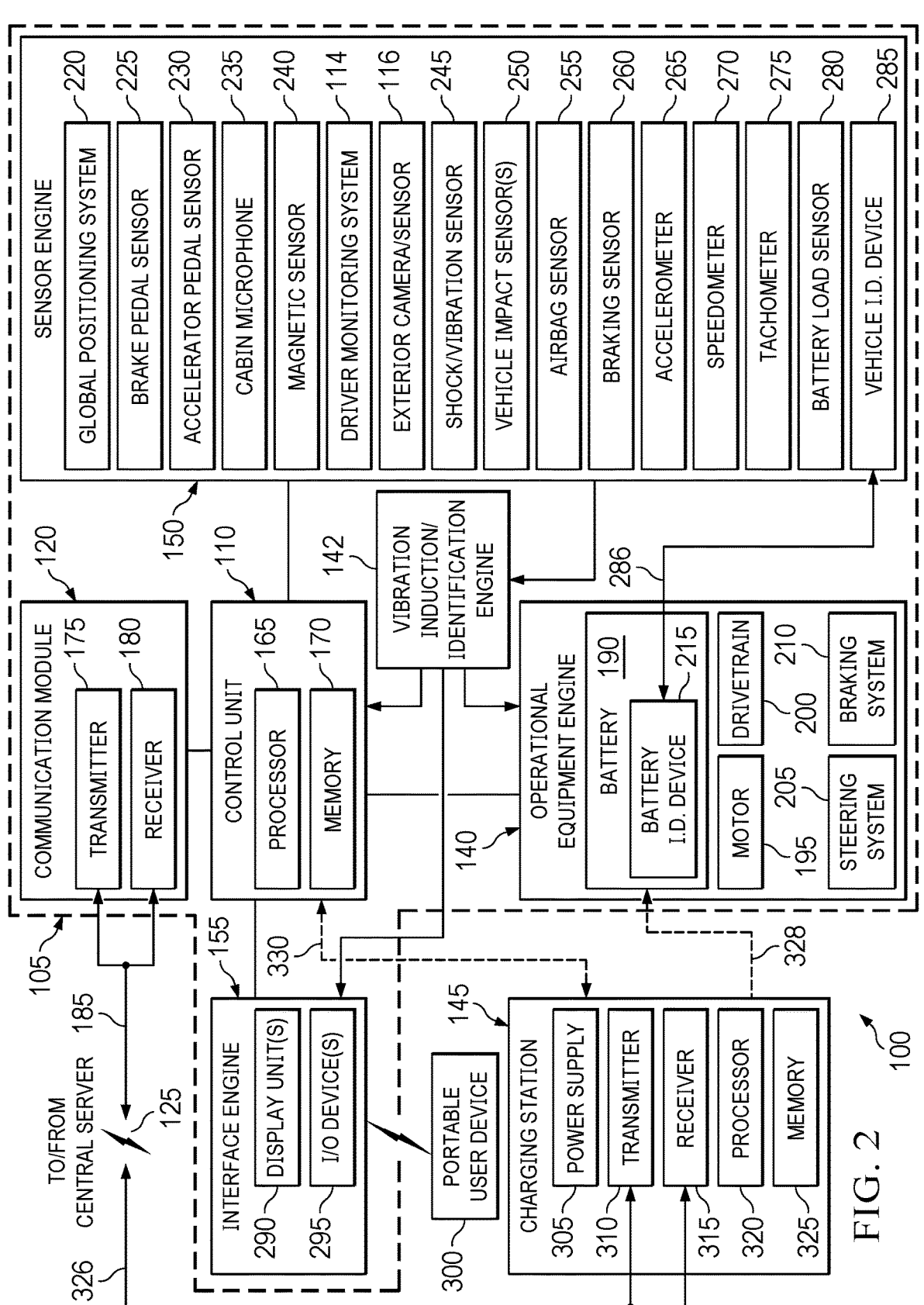
FIG. 2 is a diagrammatic illustration, in a block-diagram form, of at least a portion of the vibration induction and identification system of FIG. 1, in accordance with at least one embodiment of the present disclosure.

FIG. 2 is a diagrammatic illustration, in a block-diagram form, of at least a portion of the vibration induction and identification system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220 that can be used to determine road grade, a brake pedal sensor 225, an accelerator pedal sensor 230, a cabin microphone 235 (e.g., for voice control of vehicle features), a magnetic sensor 240, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, a driver monitoring system 114, an exterior camera or sensor 116 that can be used to monitor traffic and/or weather conditions around the vehicle, or any combinations thereof. In some instances, traffic or weather patterns may be monitored from outside the vehicle and received from a server via a network.

The microphone 235 may be part of the driver monitoring system 114, or may be a part of the vibration induction and identification engine 142, or may be a standalone unit. In some embodiments, the microphone 235 may be used to record sounds in the vehicle cabin as they would be heard by a driver or passenger of the vehicle. Such recorded sounds may be analyzed by a sound classifier (e.g., a trained neural network) to classify the type of sound (knock, ping, etc.) and its severity. In some embodiments, the microphone may be positioned outside the vehicle (e.g., on a body panel) to identify noises audible from outside the vehicle. The shock/vibration sensor 245 may in some cases be the same as the airbag sensor 255. Vibration of the vehicle by the vibration induction and identification engine 142 may in some cases be sufficient to trigger the airbags and/or other collision countermeasures. It may therefore be desirable to have these features disabled during operation of the vibration induction and identification engine 142.

The sensors or other detection devices may be configured to sense or detect activity, conditions, and circumstances in an area to which the device has access, e.g., ambient conditions, conditions within the vehicle cabin, etc. Sub-components of the sensor engine 150 may be deployed at any operational area where information on the driving of the vehicle 105 may occur. Some readings from the sensor engine 150 may be fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105, or to a technician diagnosing issues with the vehicle 105, may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The vibration induction and identification system 100 also includes a vibration induction and identification engine 142, the operation of which will be described below. In some embodiments, the vibration induction and identification engine 142 comprises a bolt-on kit that can be reversibly attached to the vehicle, and may for example communicate directly with the portable user device 300, without involvement of the vehicle control unit 110, interface engine 155, or other vehicle subsystems. In other embodiments, the vibration induction and identification engine, or portions thereof, exists as software, firmware, or hardware within another processor, such as the vehicle control unit 110, operational equipment engine 140, or brake ECU 112. The vibration induction and identification engine 142 may be in communication with one or more of the sensor engine 150, VCU 110, operational equipment engine 140, or interface engine 155.

The sensor engine 150 includes environmental sensors and vehicle sensors.

A reader of ordinary skill in the art will understand that other components or arrangements of components may be found in a vehicle 105, and that may of the same general principles apply to electric vehicles, internal combustion vehicles, and hybrid vehicles.

Figure 3:
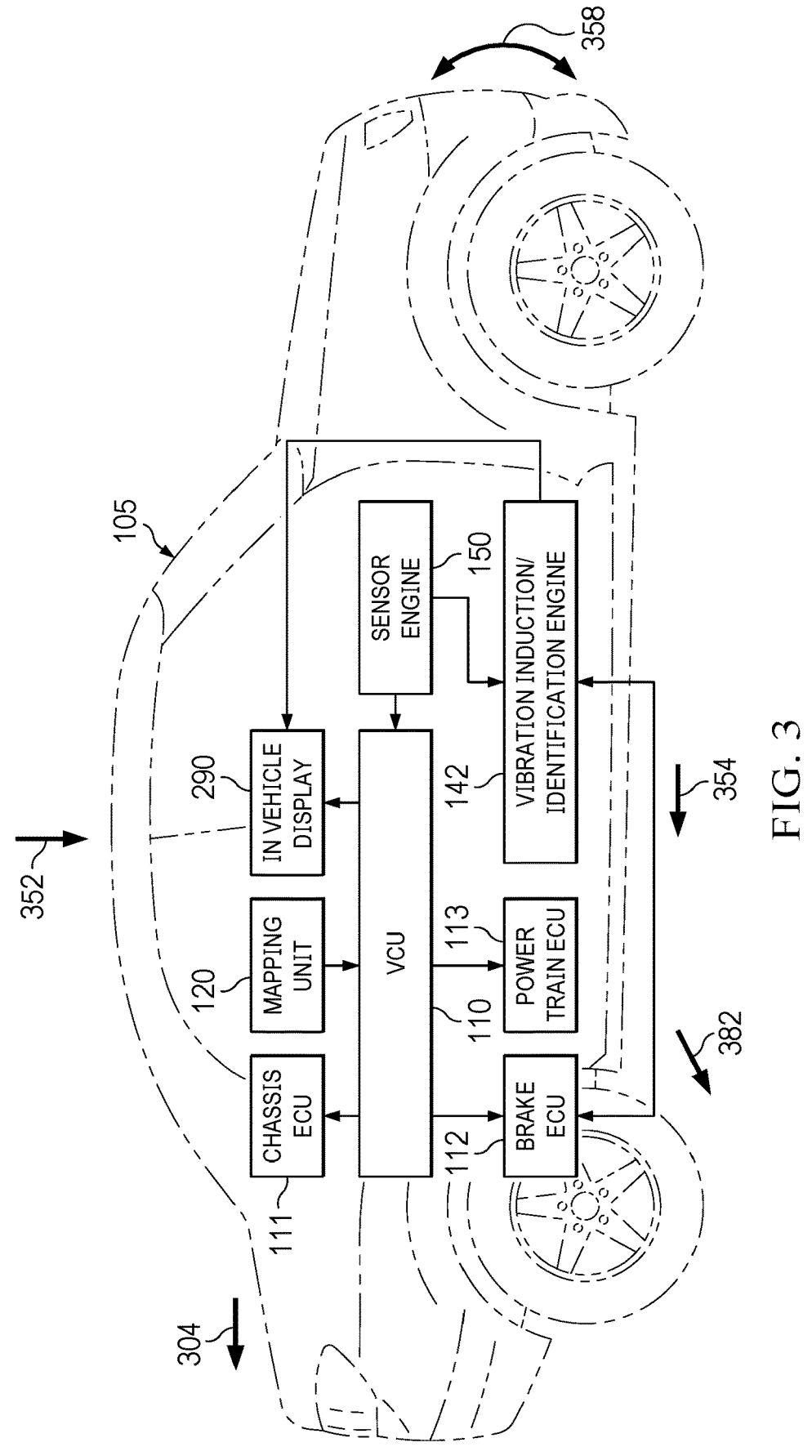
FIG. 3 is an exemplary diagrammatic illustration of the vibration induction and identification system embodied as a vehicle, in accordance with at least one embodiment of the present disclosure.

FIG. 3 is an exemplary diagrammatic illustration of the vibration induction and identification system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the vibration induction and identification system 100 shown in FIG. 3. In this example, within the vehicle 105 the VCU 110 receives information from a sensor engine 150, which receives information from environmental sensors and vehicle sensors. In addition, the VCU 110 sends information to the chassis ECU 111, brake ECU 112, power train ECU 113, and in-vehicle display 290.

Force variables that may be incorporated into physics calculations within the VCU 110, vibration induction and identification engine 142, or other engines include but are not limited to the vehicle absolute weight 352, vehicle rolling friction 354, vehicle aerodynamic drag 304, and vehicle pitch 358. In some examples, each of these variables is a force that may be expressed in lbf., Newtons, degrees, or any other unit as needed. In an example, the vehicle pitch 358 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent or parallel to the road surface. The difference between these two acceleration vectors can indicate vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship F=ma. The mass of the carried load may then be estimated by subtracting a nominal or expected vehicle mass (e.g., stock weight or stock mass). Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed 270, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle rolling resistance vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The vibration induction and identification system 100 also includes a vibration induction and identification engine 142, which accepts inputs from, and sends outputs to, the mobile device 300 (see FIG. 3) or another user interface or display (e.g., via the interface engine 155).

Figure 4:
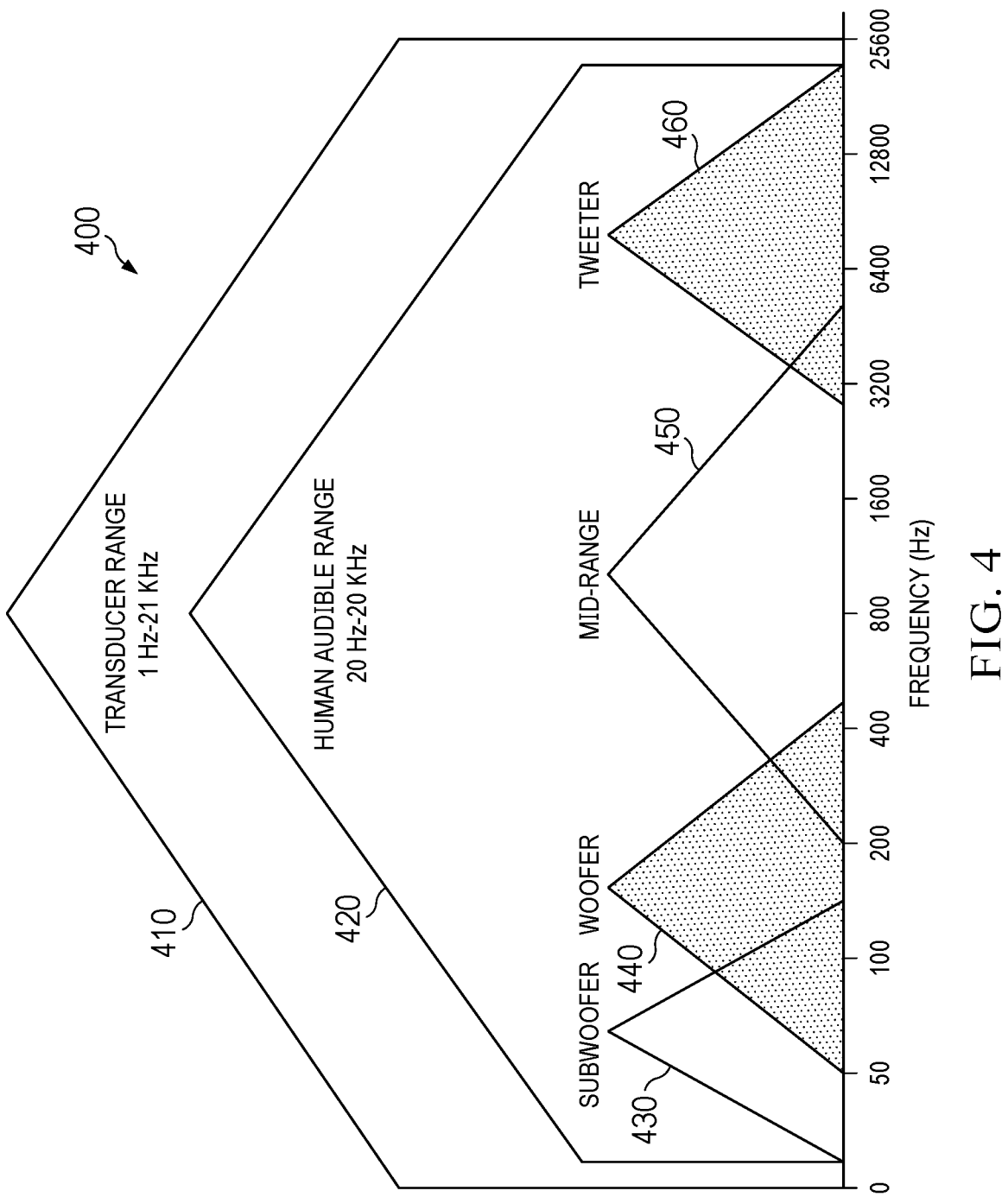
FIG. 4 is a vibration classification chart, in accordance with at least one embodiment of the present disclosure.

FIG. 4 is a vibration classification chart 400, in accordance with at least one embodiment of the present disclosure. The vibration classification chart 400 shows a preferred output frequency range 410 for the linear transducers, of between 1 Hz and 21 KHz. For reference, the vibration classification chart 400 shows a human audible range 420 of 20 Hz-20 KHz, as well as the output frequency ranges for different audio speaker types, including a subwoofer range 430 of 20-150 Hz, a woofer range 440 of 50-900 Hz, a mid range 450 of 200 Hz-6 KHz, and a tweeter range 460 of 3 KHz-20 KHz. Since a linear transducer is not limited by the dimensions of a sound-generating cone, its range of output frequencies can be quite large, in some cases exceeding the human audible range 420.

Figure 5A:
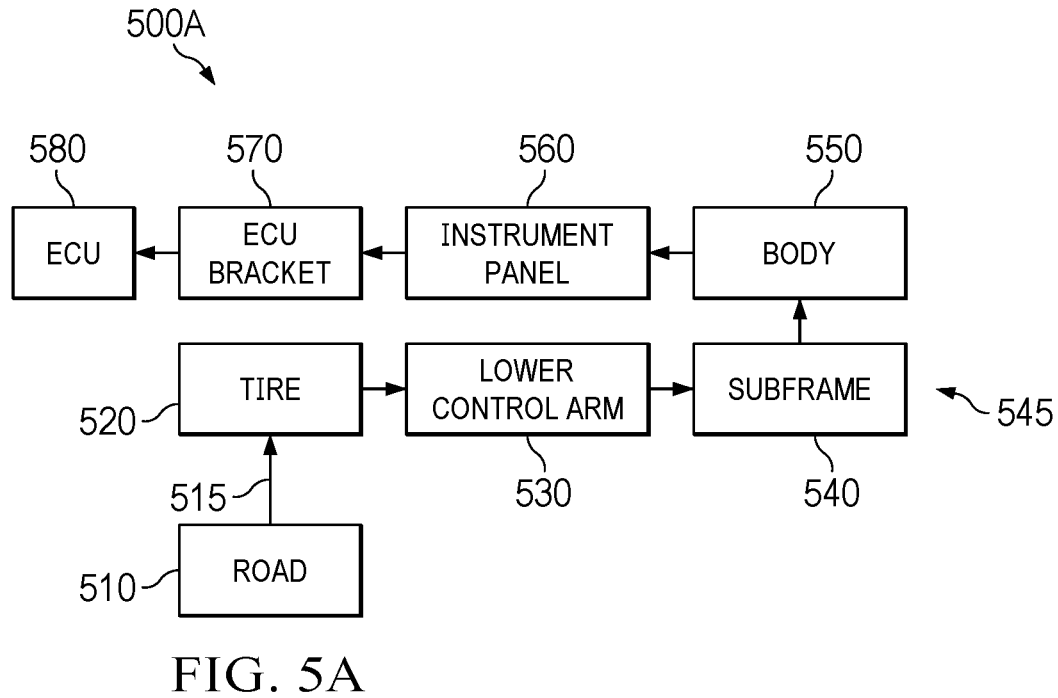
FIG. 5A is a schematic, diagrammatic representation of an example vibration path, in accordance with at least one embodiment of the present disclosure.

FIG. 5A is a schematic, diagrammatic representation of an example vibration path 500A, in accordance with at least one embodiment of the present disclosure. In an example, while the vehicle is in motion, an electronic control unit (ECU) 580 is vibrating against its holding bracket 570 inside the instrument panel 560, producing a clicking noise that has resulted in a customer complaint. However, the vibration energy 515 for these vibrations actually originates from the vibration of a tire 520 against the road 510, and is transmitted through the lower control arm 530 to the subframe 540, and then through the body 550 to the instrument panel 560, which then transmits the vibration energy through the ECU bracket 570 to the ECU 580. It is understood that myriad other vibration paths exist in a vehicle, some originating with tire vibration, and others originating with wind vibration or other sources.

In some cases, the vibration 545 of the subframe 540 may be measured with an accelerometer and recorded with a processor coupled to a memory (e.g., in the mobile device 300) of the vibration induction and identification system. In other cases, the acoustic energy of the ECU clicking noise may also be measured with a microphone or acoustic device and recorded with a processor.

Figure 5B:
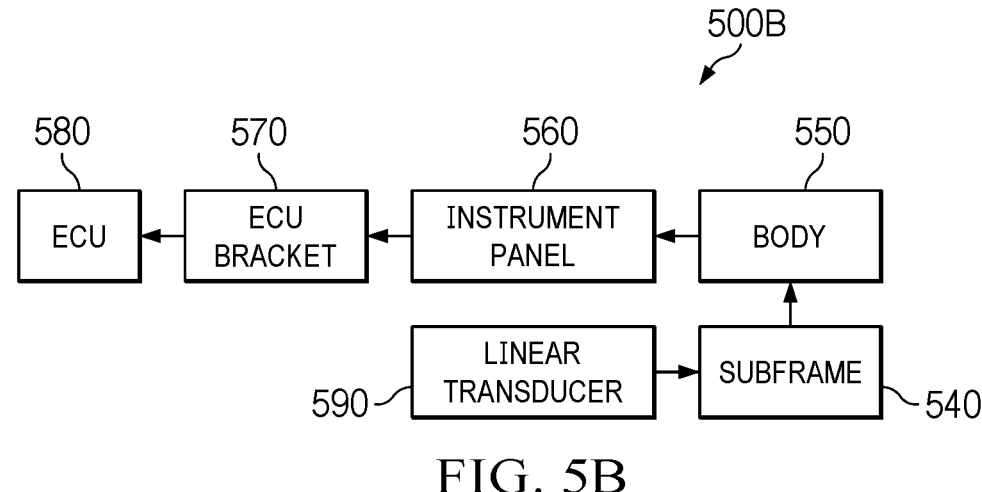
FIG. 5B is a schematic, diagrammatic representation of an example vibration path, in accordance with at least one embodiment of the present disclosure.

FIG. 5B is a schematic, diagrammatic representation of an example vibration path 500B, in accordance with at least one embodiment of the present disclosure. In the example of FIG. 5B, the vehicle is parked, and the recorded vibrations of the subframe 540 are played back through a linear transducer 590 of the vibration induction and identification system, which induces vibrations in the subframe 540 that are similar or identical to the recorded vibrations of FIG. 5A. These vibrations are then transmitted through the body 550, instrument panel 560, ECU bracket 570, and ECU 580, as before. Thus, the vibration of the ECU 580 against the ECU bracket 570 from FIG. 5A is closely reproduced, without the need for the vehicle to be driven on a rumble road or tested on a shaker table. This enables the vibration induction and identification system to take the place of both road testing and shaker table testing, thus allowing the clicking noise to be reproduced and identified rapidly, at low cost, and with little safety risk to the technicians performing the investigation.

It is noted that, instead of playing back a recorded vibration, the transducer 590 may generate a fixed-frequency (e.g., 20 Hz) vibration, or simultaneous vibrations at multiple frequencies (e.g., 10 Hz, 20 Hz, and 30 Hz), or may generate a sweep across multiple frequencies (e.g., 20 Hz to 103 Hz), with technicians or microphone-enabled detection systems (e.g., a trained neural network) listening for which subframe vibration frequency generates the reported clicking noise. In other cases, the acoustic energy of the clicking noise may also be measured with a microphone or acoustic device and recorded with a processor. This approach may be particularly advantageous as it can enable future investigations to try that particular frequency (e.g., 33 Hz) first, to see if the problem can be quickly reproduced. Once the components responsible for the clicking noise (e.g., the ECU 580 and ECU bracket 570) have been identified, an example countermeasure for this problem may be placing a small piece of padding between the two components. A wide variety of unwanted noises and vibrations can be isolated, diagnosed, and corrected in this manner.

Optionally, a transducer may be placed at any point along the vibration path, including the suspect component itself, in order to remove variables along the pathway (e.g., other components may amplify or dampen vibration along the pathway, vibration may vary with weather conditions, etc.).

Figure 6:
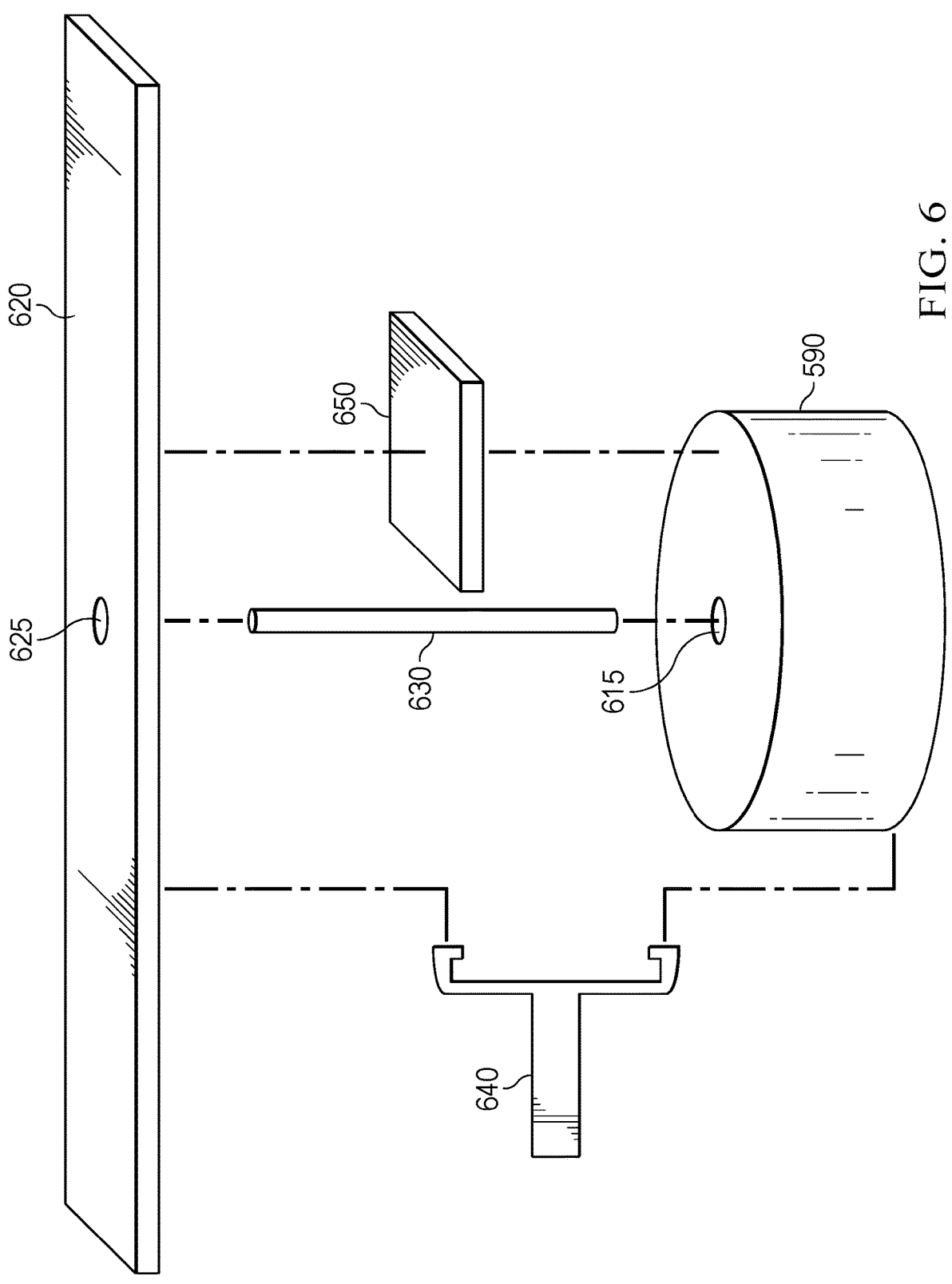
FIG. 6 is a schematic, diagrammatic representation of reversibly attaching a transducer of the vibration induction and identification system to a sub-frame rail of the vehicle, in accordance with at least one embodiment of the present disclosure.

FIG. 6 is a schematic, diagrammatic representation of reversibly attaching a transducer 590 of the vibration induction and identification system to a sub-frame rail 620 of the vehicle, in accordance with at least one embodiment of the present disclosure. In general, for unibody vehicles (e.g., vehicles with an integrated frame and body), it may be desirable to attach the transducer 590 to the front or rear sub-frame of the vehicle, as this most closely replicates the vibration path of a vehicle traveling over a road. The transducer 590 may for example be attached to the sub-frame rail 620 with a modified sub-frame bolt 630. Whereas a normal sub-frame bolt may be threaded on one end and have a head (e.g., a hex head) on the other end, the modified sub-frame both 630 may for example be threaded at both ends, and may be longer than a normal sub-frame bolt. On one end, the modified sub-frame bolt 630 threads into an existing threaded through-hole 625 in the sub-frame rail 620, through which the sub-frame rail 620 may be attached to the unibody. On the other end, the modified sub-frame bolt 630 threads into a threaded hole 615 in the transducer 590. Vibrations created by the transducer 590 can therefore be transmitted into the sub-frame rail 620 through the modified sub-frame bolt 630.

Other means of attachment may be used instead or in addition, including for example a clamp 640 that may clamp the transducer 590 (or a portion thereof) to the sub-frame rail 620 (or a portion thereof, or other portions of the sub-frame), and/or a magnet 650, which may be placed in between the transducer 590 and the sub-frame rail 620, in order to hold the transducer 590 in place on the sub-frame rail 620. Still other attachment means may be used instead or in addition, including but not limited to screws, pins, brackets, wires, friction fittings, reversible adhesives, etc.

It is understood that the transducer 590 may be attached to other components besides the sub-frame, including but not limited to components of the frame, body, engine, exhaust system, wheels, suspension, seats, dashboard, interior panels, exterior panels, and otherwise.

Figure 7:
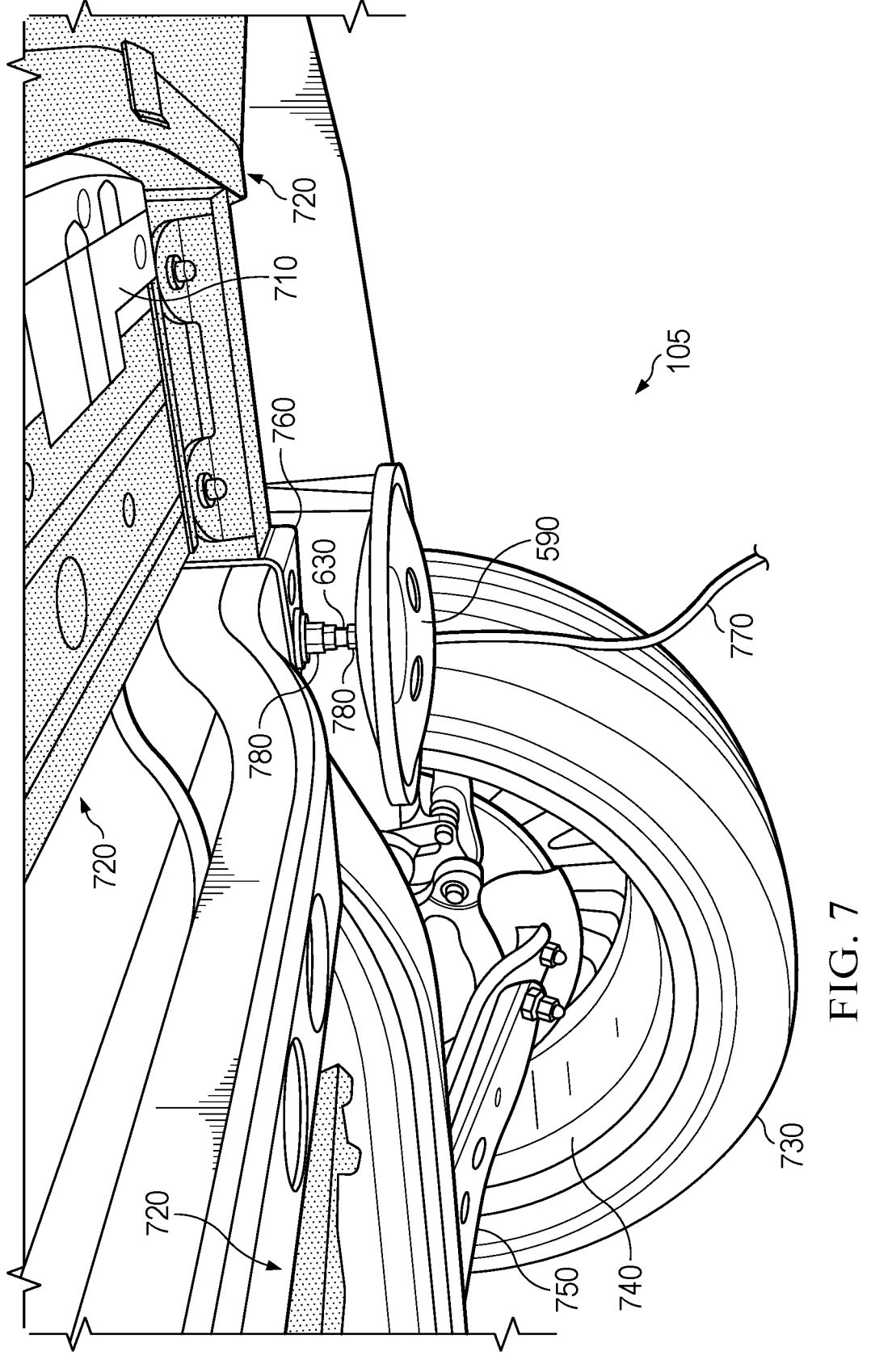
FIG. 7 is a diagrammatic representation of a transducer of the vibration induction and identification system, reversibly attached to a sub-frame bracket of the vehicle, in accordance with at least one embodiment of the present disclosure.

FIG. 7 is a diagrammatic representation of a transducer 590 of the vibration induction and identification system, reversibly attached to a sub-frame bracket 760 of the vehicle 105, in accordance with at least one embodiment of the present disclosure. Visible is the unibody 710 (e.g., the integrated frame and body) of the vehicle 105, to which the sub-frame 720 is attached. Also visible is a tire 730 and wheel 740, along with a lower control arm 750 which attaches the wheel 740 to the sub-frame 720.

In the example shown in FIG. 7, a linear transducer 590 has been attached to a bracket 760 of the sub-frame 720 with a modified sub-frame bolt 630, and tightened in place by nuts 780 threaded onto the bolt 630. An electrical cable 770 carries electrical power (e.g., alternating current at a frequency selected via the user interface of the mobile device) to the linear transducer 590, which can then transmit vibrations through the bolt 630 and clamp 640 to the sub-frame bracket 760, and from there to the sub-frame 720 and unibody 710. Since the unibody 710 may carry all vehicle components other than the wheels and suspension, vibration of the unibody 710 can be expected, through various vibration paths, to result in vibration of each of those vehicle components (e.g., each component at its own resonant frequency, or a resonant frequency of components attached to it, although other vibration frequencies may occur instead or in addition).

Figure 8:
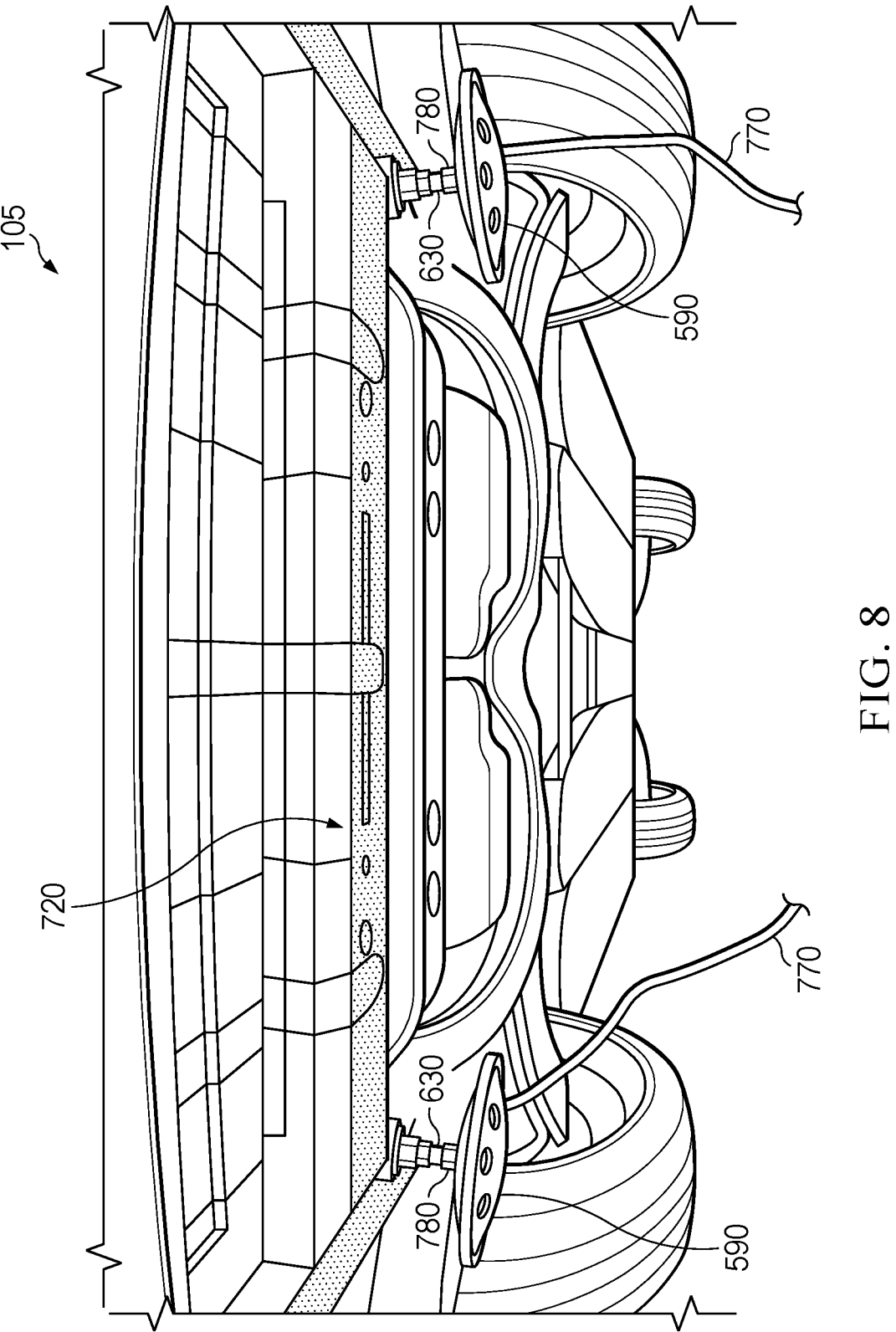
FIG. 8 is a diagrammatic representation of two transducers of the vibration induction and identification system, reversibly attached to different portions of the sub-frame of the vehicle, in accordance with at least one embodiment of the present disclosure.

FIG. 8 is a diagrammatic representation of two transducers 590 of the vibration induction and identification system, reversibly attached to different portions of the sub-frame 720 of the vehicle 105, in accordance with at least one embodiment of the present disclosure. Each transducer 590 is attached in a unique location (e.g., different from the locations of the other transducers) and is held in place by a modified sub-frame bolt 630 and nut 780, and is powered by its own power cable 770. In this way, any number of transducers 590 may be attached to the vehicle 105 in order to induce vibrations throughout the sub-frame 720 (or other portions of the vehicle), thus providing a realistic simulation of the vibrations the sub-frame (or other components) would experience while driving on a road or other surface. Thus, the vibration induction and identification system may include any number of transducers 590, including one, two, four, eight, or more transducers 590. However, it is noted that in some cases, valid results may be obtained with only one or two transducers 590 placed along key portions of a suspected vibration path, and that there may be diminishing returns (as well as added labor and cost) from attaching more than six transducers 590 to the vehicle 105.

Figure 9:
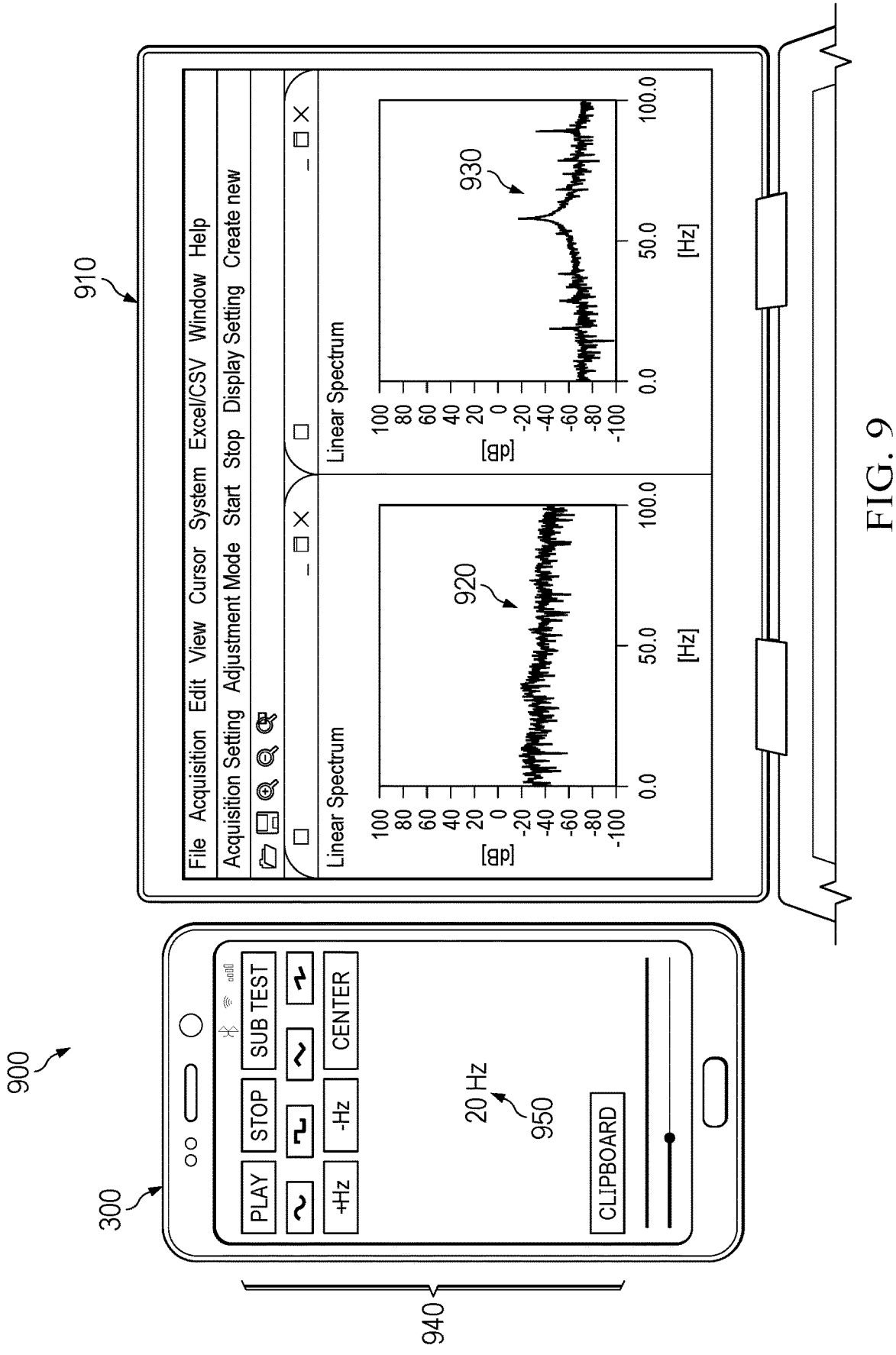
FIG. 9 is a diagrammatic comparison between actual measured road vibrations of a vehicle and vibrations induced in the same vehicle by the vibration induction and identification system, in accordance with at least one embodiment of the present disclosure.

FIG. 9 is a diagrammatic comparison 900 between actual measured road vibrations of a vehicle and vibrations induced in the same vehicle by the vibration induction and identification system, in accordance with at least one embodiment of the present disclosure. In the example shown in FIG. 9, an accelerometer data display screen 910 shows a vibration spectrum 920 measured by an accelerometer attached to the vehicle (e.g., attached to the sub-frame of the vehicle) while driving over a test surface such as a Belgium block road. This spectrum may be considered white noise, as vibrations across all frequencies from 0 to 100 Hz occur with a reported amplitude or intensity of between −20 decibels (dB) and −60 dB. Other broadband noise profiles may be recorded or created instead or in addition, including but not limited to pink noise, blue noise, Brownian noise, blue noise, violet noise, gray noise, or velvet noise.

In an example, the system can operate in two modes. In a broadband creation mode, the system can simulate the complex waveform generated by the vehicle over a road surface for purposes of detecting multitude noise sources. In a narrowband creation mode, the system can generate the specific frequency or waveform of the offending noise source, or a range or sweep of frequencies around the potential noise source resonance range, to provide targeted excitation of the noise source without excitation of additional, non-targeted sources.

The accelerometer display screen 910 also shows an induced vibration spectrum 930 that was measured by the same accelerometer at the same location on the vehicle. However, the induced vibration spectrum 920 was measured in a parked vehicle being vibrated by the vibration induction and identification system. In the example shown in FIG. 9, a vibration control application 940 of the vibration induction and identification system is running on a mobile device 300, and is commanding a single-frequency output 950 of 20 Hz from the transducers attached to the vehicle (e.g., attached to the subframe). As can be seen by the induced vibration spectrum 930, the transducer(s) are producing targeted vibration energy in a narrow band centered at 20 Hz, at the same or a similar amplitude as the road surface input graph 920, with minimal excitation of additional noise sources outside of the targeted band. However, in some instances, such a spectrum may be effective for diagnosing unwanted vibrations within particular components of the vehicle (e.g., components within the vehicle cabin). In other instances, a user may find it beneficial to play other pure tones through the transducers (e.g., 10 Hz, 30 Hz), or to play multiple tones in a set sequence, or to play a sweep of tones (e.g., a sweep from 1 Hz to 103 Hz over a user-selectable period of time, or to play a generated or recorded white noise signal, or to play a recording of actual accelerometer data from the vehicle.

It is noted that some unwanted vehicle noises or vibrations may occur at particular resonance frequencies, such that a transducer excitation frequency of between 32 Hz and 34 Hz will re-create the unwanted noise or vibration, whereas an excitation frequency of 31 Hz or less, or 35 Hz or more, will not recreate the unwanted noise or vibration. Thus, a white noise excitation spectrum or frequency sweep may be particularly useful in diagnosing noises or vibrations of this type. It is further noted that a particular unwanted noise or vibration may occur, or may be detectable to a user, only when the excitation energy exceeds a threshold value. Thus, even where the correct excitation frequency is known, it may be useful to perform an amplitude sweep at that frequency, to determine how much vibration (e.g., measured in g) or input power (e.g., measured in Watts) is necessary to reproduce the problem. The knowledge of key excitation frequencies and power levels may be useful in future diagnoses. For example, the memory of the vibration induction and identification system may store preset vibration programs for reproducing the 10 most common or 100 most common customer complaints.

Figure 10:
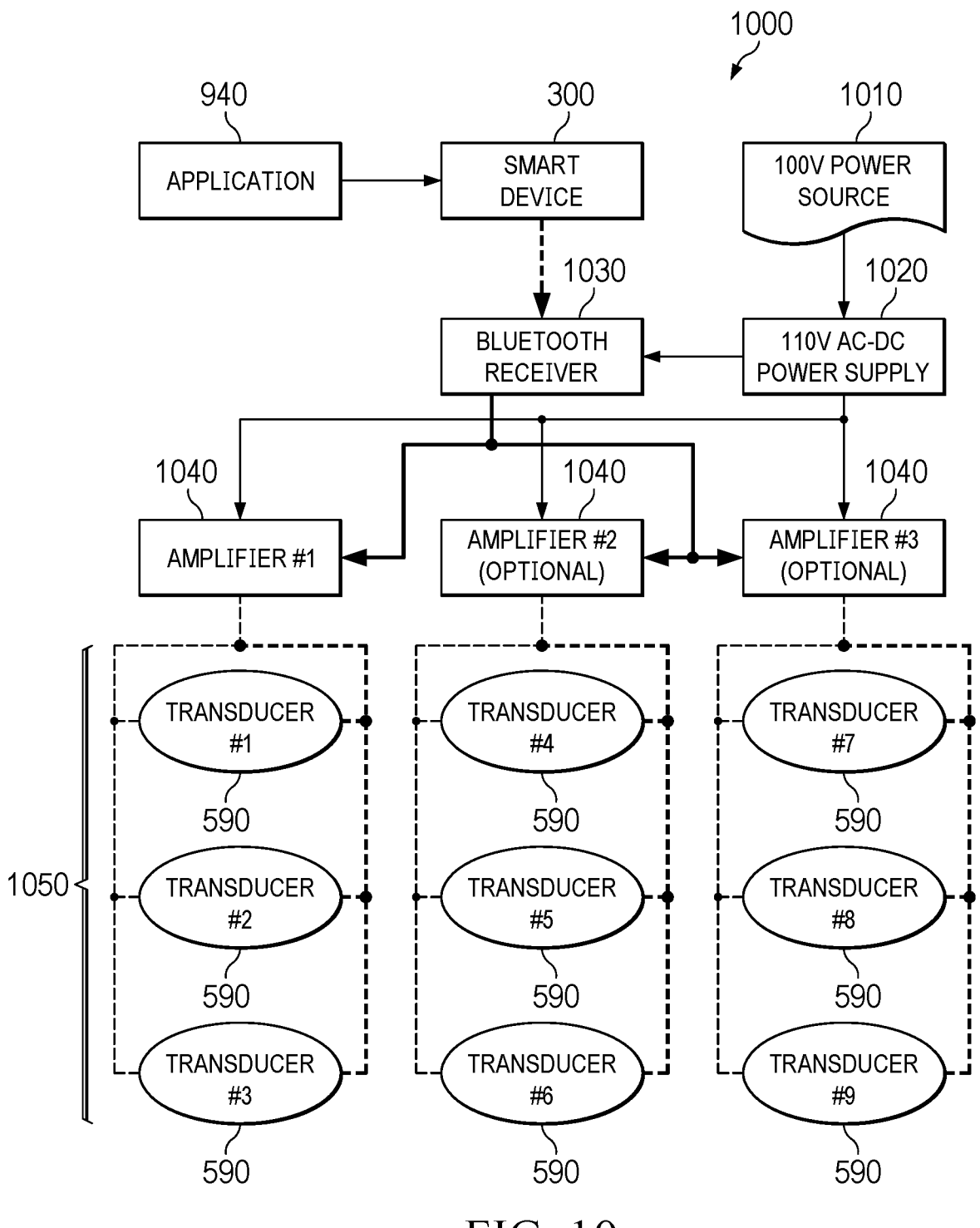
FIG. 10 is a wiring diagram or block diagram of an example vibration induction and identification system, in accordance with at least one embodiment of the present disclosure.

FIG. 10 is a wiring diagram or block diagram 1000 of an example vibration induction and identification system, in accordance with at least one embodiment of the present disclosure. In the example shown in FIG. 10, the vibration induction and identification system includes a smart device 300, which executes a software application 940 for selecting an output frequency or excitation frequency (or multiple excitation frequencies) for the transducers 590. The software application 940, via the smart device 300, transmits the desired frequency or frequencies to a Bluetooth receiver 1030, which receives power from a 110V alternating current to direct current (AC to DC) converter 1020 that receives 110V AC power from a 110V AC power source 1010 and outputs 110V DC power.

The AC-DC converter also supplies DC power to one or more amplifiers 1040, which receive the commanded frequency or frequencies from the Bluetooth receiver 1030, and output AC electrical signals (e.g., alternating voltages and/or currents) at these frequencies through a parallel electrical connection 1050 to one or more transducers 590. This causes the transducers to vibrate (e.g., to repeatedly displace an internal mass) at the commanded frequency or frequencies. When the transducers 590 are attached to the vehicle (e.g., to the sub-frame), these vibrations (e.g., the vibration energy) can in turn be transmitted to the vehicle as described above. It is noted that each amplifier 1040 can output a different frequency or frequencies such that, for example, one amplifier 1040 and the transducers 590 connected to it are used to reproduce engine vibrations of a moving vehicle, while another amplifier 1040 and its associated transducers 590 are used to reproduce chassis vibrations of the moving vehicle. Myriad other combinations are possible and fall within the scope of this disclosure.

It is understood that other power types than 110V AC may supply the system, including other voltages, both higher and lower, and alternating and direct currents, whether supplied by batteries, wall outlets, power ports, vehicle electrical busses, or otherwise. Similarly, it is understood that other computer architectures may be used instead or in addition to that shown here. For example, the mobile device 300 and Bluetooth receiver 1030 could be replaced with a single processor circuit that includes a user interface such as a touchscreen. In some embodiments, any or all of the processor circuit, 110V power source 1010, AC-DC converter 1020 and amplifier(s) 1040 may be contained in a single case or housing, or may have separate cases or housings.

It is noted that block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a flow of data, energy, and/or vibration. It is understood that some embodiments of the systems disclosed herein may include additional components, that some components shown may be absent from some embodiments, and that the arrangement of components may be different than shown, resulting in different data, energy, and/or vibration flows while still performing the methods described herein.

Figure 11:
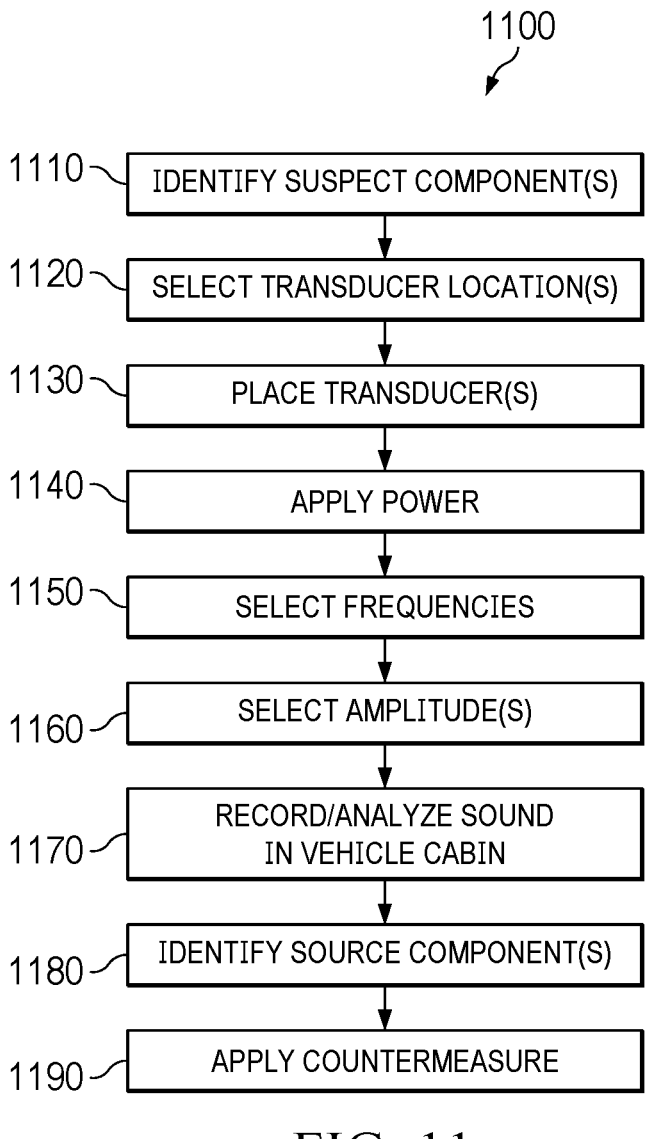
FIG. 11 is a schematic, diagrammatic representation, in flow diagram form, of a method for detection, reproduction, isolation, and mitigation of vehicle noise sources, in accordance with at least one embodiment of the present disclosure.

FIG. 11 is a schematic, diagrammatic representation, in flow diagram form, of a method 1100 for detection, reproduction, isolation, and mitigation of vehicle noise sources, in accordance with at least one embodiment of the present disclosure. It is noted that some steps may be performed automatically by the vibration induction and identification system, while others may be performed by a human under the instruction of the vibration induction and identification system, or components thereof (e.g., the processor).

In step 1110, the method 1100 includes identifying one or more suspect components, or regions where the suspect components are located. For example, in the case of a rattling noise coming from behind the dashboard, it may not be possible for technicians to specifically identify which components are suspected of generating the noise. However, a general region such as "behind the dashboard" may be sufficient to enable the subsequent steps. Execution then proceeds to step 1120.

In step 1120, the method 1100 includes, based on the location(s) of the suspect component(s), selecting locations where the linear transducer(s) will be attached. In many cases, attaching the transducer(s) to the vehicle subframe will be sufficient to diagnose unwanted vibrations in various parts of the vehicle. However, depending on the exact nature and location of the unwanted vibration, other transducer locations may be preferred, including locations on or near the engine, wheels, suspension, exhaust system, frame, body, interior panels, exterior panels, etc. In some cases, it may even be desirable to place a transducer directly onto a suspect component. Execution then proceeds to step 1130.

In step 1130, the method 1100 includes placing the transducer(s) in the selected location(s). This may involve attachment hardware as described above in FIG. 6. Execution then proceeds to step 1140.

In step 1140, the method 1100 includes applying power to converters, receivers, amplifiers, and other components that are necessary for generating vibration with the transducers (see e.g. FIG. 10, above). Execution then proceeds to step 1150.

In step 1150, the method 1100 includes selecting the excitation frequency or frequencies at which to vibrate the transducer(s), as described above. In many cases, it may be desirable for all of the transducers to vibrate at the same frequency or frequencies. However, in other cases it may be desirable to comment the transducers connected to a first amplifier to vibrate at a first set of frequencies and the transducers connected to a second amplifier to vibrate at a second set of frequencies. Execution then proceeds to step 1160.

In step 1160, the method 1100 includes selecting the amplitudes, intensities, or power outputs of each amplifier, which in turn affects the amplitudes, intensities, or power outputs of the transducers wired to that amplifier. Execution then proceeds to step 1170.

In step 1170, the method 1100 includes analyzing sounds or vibrations generated within the vehicle by the excitation vibrations of the transducers. Such analysis may for example include classifying the type of sound or vibration (knocking, ticking, clicking, humming, pinging, ringing, whining, screeching, banging, rattling, etc.), classifying the volume or severity of the sound or vibration, and/or determining whether the sound or vibration matches the description in one or more user complaints. In some cases, this analysis may be performed in real time, either by a technician or by an automated system such as a trained neural network. In other cases, the analysis may be performed offline on recordings from a microphone or accelerometer. Execution then proceeds to step 1180.

In step 1180, the method 1100 includes identifying the component(s) responsible for the unwanted sound or vibration. In some cases, this identification may be performed based on the sound alone (e.g., for distinctive sounds or vibrations clearly associated with a particular component, such as a squeaky seat spring). In other cases, the identification may require tracing (e.g., by ear, or with a microphone, stethoscope, accelerometer, etc.) the location where the sound or vibration is most pronounced. In still other cases, the identification may require removal of components one by one until the unwanted sound or vibration ceases. Other identification methods, as would occur to a person of ordinary skill in the art, may be used instead or in addition, without departing from the spirit of the present disclosure. Execution then proceeds to step 1190.

In step 1190, the method 1100 includes applying a countermeasure to the component identified as the source of the unwanted sound of vibration. Depending on the type of component, the countermeasures may be quite diverse. Examples include tightening, loosening, replacing, or permanently removing the component, applying lubrication or adhesive, placing padding or sound baffles, fully closing a latch, etc. The method is now complete.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in some instances, a system or component generating vibrations within a range of 1 Hz to 21 KHz may need to operate at a clock speed of 21 KHz or higher.

Figure 12:
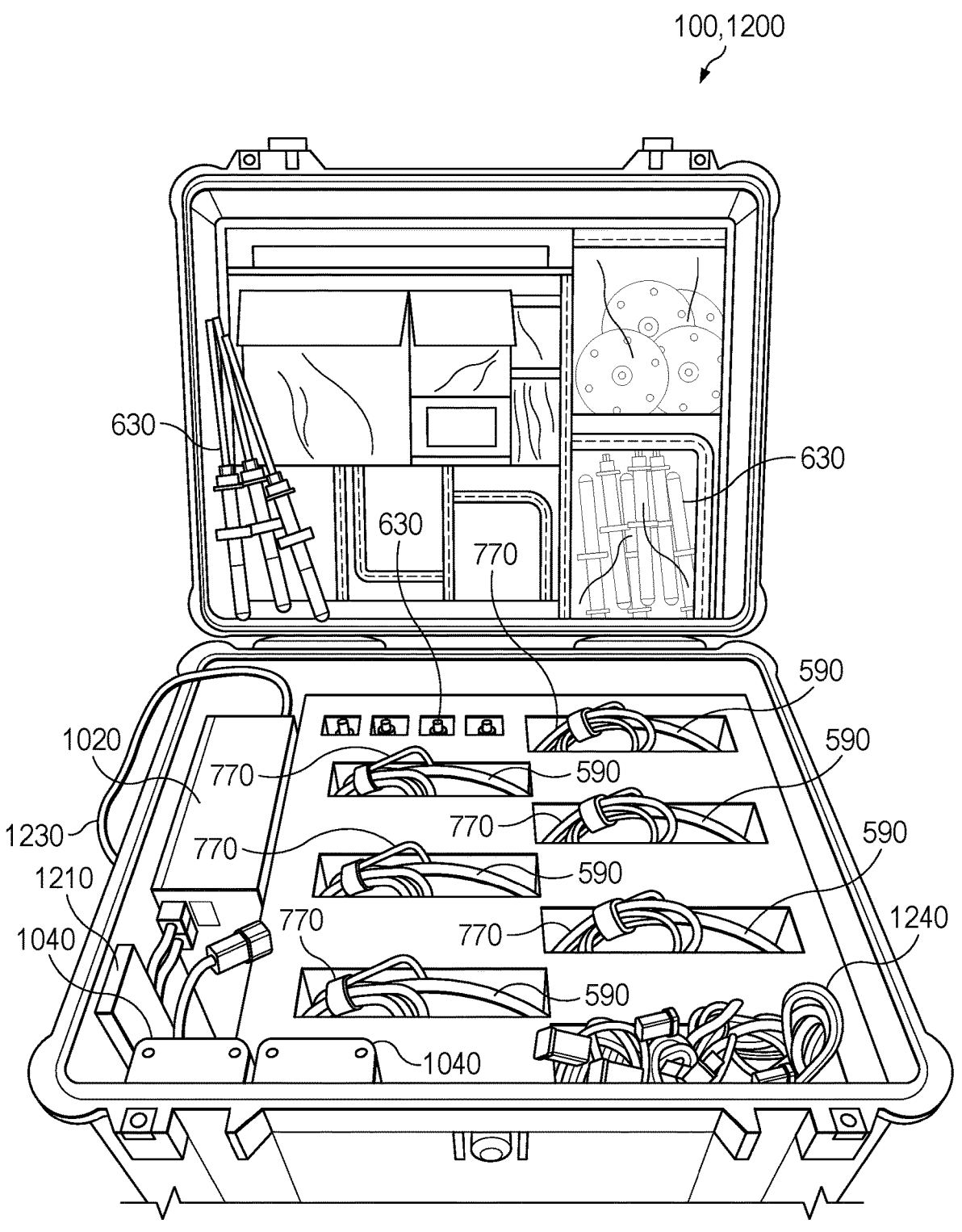
FIG. 12 is a front top view of an example vibration induction and identification system in the form of a portable kit, in accordance with at least one embodiment of the present disclosure.

FIG. 12 is a front top view of an example vibration induction and identification system 100 in the form of a portable kit 1200, in accordance with at least one embodiment of the present disclosure. The portable kit 1200 includes a storage case 1210 which holds components of the vibration induction and identification system 100, along with foam padding 1220 to protect the components. Visible are various types of modified sub-frame bolts 630, an AC power cord 1230 for connecting to a 120V AC power source such as a wall outlet, the AC-DC converter 1020, two amplifiers 1040, and six transducers 590 with electrical cables 770, plus extension cables 1240 and the Bluetooth receiver 1210. In an example, the portable kit 1200 has a size and mass suitable for carrying by a single person, such that it can easily be carried to field investigation sites such as a customer's home, rather than requiring the vehicle to be taken to a service center. Since the portable kit 1200 can accurately reproduce many of the features of a fixed-in-location rumble road or a non-portable, vehicle-sized shaker table, the vibration induction and identification system 100 clearly represents a significant advancement in the art, as it permits rapid, accurate, repeatable assessments to be performed anywhere a vehicle can be parked.

Figure 13:
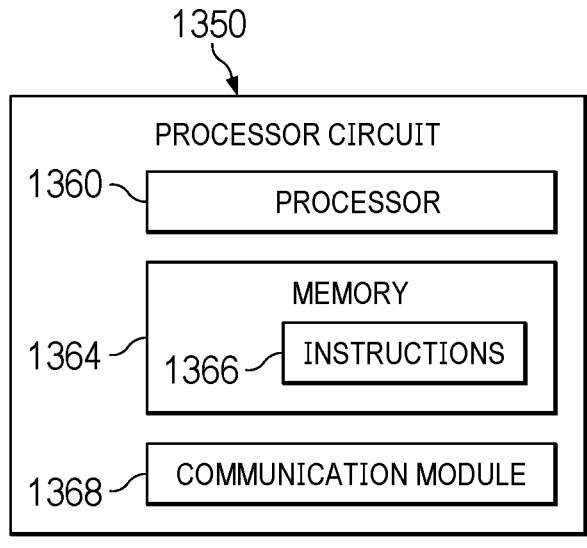
FIG. 13 is a schematic diagram of a processor circuit, in accordance with at least one embodiment of the present disclosure.

FIG. 13 is a schematic diagram of a processor circuit 1350, in accordance with at least one embodiment of the present disclosure. The processor circuit 1350 may be implemented in the vibration induction and identification system 100, or other devices or workstations (e.g., third-party workstations, network routers, etc.), or on a cloud processor or other remote processing unit, as necessary to implement the method. As shown, the processor circuit 1350 may include a processor 1360, a memory 1364, and a communication module 1368. These elements may be in direct or indirect communication with each other, for example via one or more buses.

The processor 1360 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1360 may also comprise another hardware device, a firmware device, or any combination thereof configured to perform the operations described herein. The processor 1360 may also be implemented as a combination of computing devices, e.g., a combination of a DSP and a microprocessor, a plurality of microprocessors, one or more microprocessors in conjunction with a DSP core, or any other such configuration.

The memory 1364 may include a cache memory (e.g., a cache memory of the processor 1360), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1364 includes a non-transitory computer-readable medium. The memory 1364 may store instructions 1366. The instructions 1366 may include instructions that, when executed by the processor 1360, cause the processor 1360 to perform the operations described herein. Instructions 1366 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1368 can include any electronic circuitry and/or logic circuitry to facilitate direct or indirect communication of data between the processor circuit 1350, and other processors or devices. In that regard, the communication module 1368 can be an input/output (I/O) device. In some instances, the communication module 1368 facilitates direct or indirect communication between various elements of the processor circuit 1350 and/or the vibration induction and identification system 100. The communication module 1368 may communicate within the processor circuit 1350 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MOD-BUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the vibration induction and identification system advantageously reproduces critical features of both a rumble road and a vehicle-sized, four-post shaker table, but in a man-portable kit that can be deployed anywhere a vehicle can be parked. Accordingly, it can be seen that the vibration induction and identification system fills a need in the art, by reducing the time, cost, and inconvenience of investigating unwanted sounds and vibrations in a vehicle, while increasing the safety, accuracy, and repeatability of the testing. Furthermore, since the vibration induction and identification system does not require the involvement of tires, wheels, or suspension systems, it can be used to identify problems across numerous vehicle types, such as cars and trucks, without retooling.

A number of variations are possible on the examples and embodiments described above. For example, the transducers may not be linear (one-dimensional), but may generate two-dimensional or three-dimensional vibrations, without departing from the spirit of the present disclosure. With no changes or minor changes from the configurations described above, the technology described herein can be applied to vehicles of any type or size, including accessories such as toppers, trailers, and indeed to non-vehicular equipment or structures of any type where vibration can lead to unwanted noises or vibrations. Examples include but are not limited to factory equipment, buildings, bridges, utility towers, wind turbines, etc.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vibration induction and identification system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vibration induction and identification system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensors may be employed, whether internal or external to the vehicle. Machine learning algorithms or other AI systems may be used to classify unwanted sounds or vibrations and to identify the components that cause them.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system comprising:
a vehicle;
a power supply;
a processor circuit comprising a processor and a memory;
a user interface operating on the processor circuit and configured to receive a user selection of a frequency and amplitude;
at least one amplifier in communication with the user interface and configured to:
receive power from the power supply; and
output an alternating current electrical signal at the selected frequency and amplitude; and
at least one linear transducer separate from the vehicle and configured to:
attach to the vehicle;
receive the alternating current electrical signal at the selected frequency and amplitude; and
generate a vibration at the selected frequency and amplitude,
wherein when the at least one linear transducer is attached to the vehicle, the vibration generated by the at least one linear transducer is transmitted into components of the vehicle.

2. The system of claim 1, wherein the user interface is configured to receive a selection of multiple frequencies or amplitudes, and
wherein the at least one amplifier is configured to output the alternating current electrical signal at the selected multiple frequencies or amplitudes, and
wherein the at least one linear transducer is configured to generate a vibration at the selected multiple frequencies or amplitudes.

3. The system of claim 2, wherein the multiple frequencies or amplitudes comprise a sweep.

4. The system of claim 2, wherein the multiple frequencies or amplitudes comprise a broadband noise profile comprising white noise, pink noise, blue noise, Brownian noise, blue noise, violet noise, gray noise, or velvet noise.

5. The system of claim 1, wherein the at least one linear transducer comprises a plurality of linear transducers receiving the electrical signal from one amplifier.

6. The system of claim 1, wherein the at least one amplifier comprises a plurality of amplifiers, each outputting an alternating current electrical signal at the selected frequency and amplitude.

7. The system of claim 1, wherein the at least one amplifier comprises a plurality of amplifiers, each outputting an electrical signal at different selected frequencies or amplitudes.

8. The system of claim 1, wherein the vibration transmitted into components of the vehicle reproduces a vibration generated by the vehicle moving over a rumble road or shaking on a shaker table.

9. The system of claim 1, wherein the vibration transmitted into components of the vehicle reproduces a user-reported unwanted sound or vibration.

10. The system of claim 9, wherein the vibration transmitted into components of the vehicle can be used to identify a component responsible for the unwanted sound or vibration.

11. The system of claim 1, wherein the at least one linear transducer is configured to vibrate at a bandwidth spanning from about 20 Hz to about 103 Hz.

12. The system of claim 1, wherein the at least one linear transducer is configured to vibrate at a bandwidth spanning from about 1 Hz to about 21 KHz.

13. A device comprising:
a power supply;
a processor circuit comprising a processor and a memory;
a user interface operating on the processor circuit and configured to receive a user selection of a frequency and amplitude;
at least one amplifier in communication with the user interface and configured to:
receive power from the power supply; and
output an alternating current electrical signal at the selected frequency and amplitude; and
at least one linear transducer separate from the vehicle and configured to:
attach to a vehicle;
receive the alternating current electrical signal at the selected frequency and amplitude; and
generate a vibration at the selected frequency and amplitude,
wherein when the at least one linear transducer is attached to the vehicle, the vibration generated by the at least one linear transducer is transmitted into components of the vehicle.

14. The device of claim 13, wherein the user interface is configured to receive a selection of multiple frequencies or amplitudes, and
wherein the at least one amplifier is configured to output the alternating current electrical signal at the selected multiple frequencies or amplitudes, and
wherein the at least one linear transducer is configured to generate a vibration at the selected multiple frequencies or amplitudes.

15. The device of claim 14, wherein the multiple frequencies or amplitudes comprise a sweep or a broadband noise profile comprising white noise, pink noise, blue noise, Brownian noise, blue noise, violet noise, gray noise, or velvet noise.

16. The device of claim 13, wherein the at least one linear transducer comprises a plurality of linear transducers or the at least one amplifier comprises a plurality of amplifiers.

17. The device of claim 13, wherein the vibration transmitted into components of the vehicle reproduces a vibration generated by the vehicle moving over a rumble road or shaking on a shaker table.

18. The device of claim 13, wherein the vibration transmitted into components of the vehicle reproduces a user-reported unwanted sound or vibration and can be used to identify a component responsible for the unwanted sound or vibration.

19. The device of claim 13, wherein at least one linear transducer is configured to vibrate at a bandwidth spanning from about 20 Hz to about 103 Hz or from about 1 Hz to about 21 KHz.

20. A method comprising:

providing a processor circuit comprising a processor and a memory; providing at least one amplifier in communication with the processor circuit;

receiving a selection of a frequency and amplitude via a user interface operating on the processor;

receiving power from a power supply into the at least one amplifier; and outputting an electrical signal at the selected frequency and amplitude from the at least one amplifier;

attaching at least one linear transducer to a corresponding at least one location on a vehicle; receiving the electrical signal at the selected frequency and amplitude into the at least one transducer; and generating a vibration at the selected frequency and amplitude from the at least one linear transducer, such that the vibration is transmitted into components of the vehicle to reproduce a vibration generated by the vehicle moving over a rumble road or shaking on a shaker table.

\* \* \* \* \*